(12) United States Patent
Vourch et al.

(10) Patent No.: US 8,010,273 B2
(45) Date of Patent: Aug. 30, 2011

(54) METHOD FOR ADAPTING EMERGENCY BRAKING DETECTION TO SEQUENCED BRAKING RECOGNITION

(75) Inventors: Geraldine Vourch, Montigny le Bretonneux (FR); Francois Yon, St Aubain sur Gaillon (FR); Gregory Kobiela, Deville les Rouen (FR)

(73) Assignee: Renault S.A.S., Boulogne Billancourt (FR)

( * ) Notice: Subject to any disclaimer, the term of this patent is extended or adjusted under 35 U.S.C. 154(b) by 601 days.

(21) Appl. No.: 12/065,418

(22) PCT Filed: Jul. 10, 2006

(86) PCT No.: PCT/FR2006/050691
§ 371 (c)(1),
(2), (4) Date: Aug. 27, 2008

(87) PCT Pub. No.: WO2007/026088
PCT Pub. Date: Mar. 8, 2007

(65) Prior Publication Data
US 2009/0198428 A1    Aug. 6, 2009

(30) Foreign Application Priority Data
Sep. 2, 2005    (FR) .................................... 05 08999

(51) Int. Cl.
*G06F 19/00*    (2006.01)

(52) U.S. Cl. ................ 701/91; 701/70; 701/76; 701/78; 701/83

(58) Field of Classification Search .............. 701/70–91; 303/114.3, 113.3, 113.2, 113.4, 166
See application file for complete search history.

(56) References Cited

U.S. PATENT DOCUMENTS

| 6,361,126 | B1 | 3/2002 | Pueschel et al. | |
|---|---|---|---|---|
| 6,470,986 | B2 * | 10/2002 | Fuchs et al. | 180/169 |
| 7,201,455 | B2 * | 4/2007 | Quirant et al. | 303/9.75 |
| 7,267,412 | B2 * | 9/2007 | Gronau et al. | 303/114.3 |

FOREIGN PATENT DOCUMENTS

| EP | 0 895 917 | 2/1999 |
|---|---|---|
| EP | 1 081 006 | 3/2001 |
| FR | 2 720 356 | 12/1995 |

\* cited by examiner

*Primary Examiner* — Richard M. Camby
(74) *Attorney, Agent, or Firm* — Oblon, Spivak, McClelland, Maier & Neustadt, L.L.P.

(57) ABSTRACT

A method for controlling braking in a motor vehicle equipped with a brake servo unit capable of being implemented in a braking system including: a hydraulic master cylinder associated with a vacuum brake booster and with hydraulic circuits supplying the wheel brakes equipping the vehicle wheels; an ABS hydraulic unit with wheel antiskid function, and an electronic mechanism implementing emergency braking assisted by the hydraulic unit. The method detects serial repetition in time for implementing emergency braking operations and adapts the conditions for implementing an emergency braking in case of serial repetition.

10 Claims, 2 Drawing Sheets

METHOD FOR ADAPTING EMERGENCY BRAKING DETECTION TO SEQUENCED BRAKING RECOGNITION

BACKGROUND OF THE INVENTION

1. Field of the Invention

The present invention relates to an assisted braking method and system in a motor vehicle and more particularly to adapting emergency braking detection to sequenced braking recognition, in other words the recognition of braking operations which occur close together in time.

2. Description of Related Art

In a known manner, a conventional hydraulic braking installation in a vehicle comprises at least one hydraulic braking circuit, conventionally two, each of these braking circuits being associated with at least one wheel brake, conventionally with two wheel brakes.

These braking circuits are supplied, in the case of normal assisted braking, by a master cylinder which can be actuated by means of the brake pedal via a braking force amplifier, generally a vacuum brake booster. The latter comprises a working chamber which is separated by a movable piston from a low-pressure chamber maintained permanently at a low pressure, i.e. a negative pressure with respect to atmospheric pressure, and on which the application of a pedal force makes it possible to place the working chamber under atmospheric pressure and correspondingly amplify the pedal force via the force acting on the movable piston.

Moreover, to prevent the wheels from locking, something which may cause the vehicle to lose control, antilock braking systems (ABS) have been developed and are now very widespread. They allow the braking pressure in the wheel brake to be controlled while monitoring the speed of rotation of each of the wheels. It is thus possible to obtain stable dynamic vehicle behavior during braking, even heavy braking. This type of system comprises a hydraulic braking block with electronic control comprising inlet valves and outlet valves which can be controlled electrically and which are associated with the various wheel brakes, a pressure sensor representing the pressure in the master cylinder, and delivery pumps, for example electrically driven delivery pumps, associated with a respective braking circuit. Depending on the dynamic behavior of the monitored wheel, the corresponding braking pressure can be relaxed to prevent locking by discharging some hydraulic fluid from the wheel brake in question to the delivery pump, then increased again by means of the high-pressure hydraulic fluid coming from the outlet of the delivery pump or from an accumulator associated with this pump.

The systems of the ABS type are often coupled to vehicle dynamics control systems, for example of the electronic stability program (ESP) type or antislip regulation (ASR) type. These systems are integrated with the hydraulic block of the ABS device. These vehicle dynamics control systems make it possible to provide a stable dynamic vehicle behavior by acting on the wheel brakes without the brake pedal having been pressed by the driver of the vehicle.

With such an ESP braking system, it is known to employ a hydraulic brake assist (HBA) function whereby the braking is performed with the assistance of the hydraulic block. More precisely, when this HBA function is employed, the hydraulic block autonomously raises the pressure of the hydraulic fluid in the hydraulic block so as to optimize the braking by reaching the limit of activation of the ABS device as quickly as possible.

In the case of sudden braking (or emergency braking), that is to say when the brake pedal is, for example, subjected very rapidly to a considerable pressure by the driver, the vehicle, equipped with an ESP hydraulic block with HBA function, is braked with the assistance provided by the hydraulic block following determination of an emergency braking situation.

The conventional criteria used to determine these emergency braking situations are, for example, the pressure in the master cylinder and/or the pressure gradient in the master cylinder, which allow good characterization of emergency braking operations.

The disadvantage of a hydraulic braking system with a vacuum brake booster lies in the fact that, in the case of rapidly repeated emergency braking operations, the pressure difference between the two chambers of the brake booster does not have time to become reestablished. The braking pressure is thus increased progressively less by the brake booster and it becomes more and more difficult to reach the emergency braking activation threshold.

Document U.S. Pat. No. 6,361,126 describes a solution to this problem. The emergency braking method according to that document takes into account the difference between the measurement of the pressure in one of the two chambers and the atmospheric pressure, and also the gradient of this pressure difference. Hence, the method according to document U.S. Pat. No. 6,361,126 makes it possible to adapt the pressure threshold to be reached in the master cylinder for triggering emergency braking to four criteria (the pressure in the master cylinder, the gradient with respect to time of the pressure in the master cylinder, the difference between the pressure measured in one of the chambers of the vacuum brake booster and the gradient of this pressure difference), making it possible in particular to characterize the repeated emergency braking situations and consequently adapt the activation of emergency braking. However, this method has the disadvantage of requiring the use of means for measuring the pressure in one of the brake booster chambers and of means for comparing this measured pressure with the atmospheric pressure, thus increasing the cost of the device.

BRIEF SUMMARY OF THE INVENTION

One aim of the invention is hence to provide a method and a device making it possible to correctly determine even repeated emergency braking situations and to adapt the emergency braking activation without requiring additional means for measuring the pressure in the master cylinder and/or means for comparison with this measurement.

This aim is achieved by means of a method of controlling braking in a motor vehicle provided with an assisted braking system comprising:

- a hydraulic master cylinder associated with a vacuum brake booster and with at least one hydraulic circuit, designed to operate, separately or simultaneously, one or more wheel brakes each equipping a wheel of the vehicle,
- a hydraulic block with electronic control comprising means for supplying high-pressure hydraulic fluid to said wheel brake or brakes,
- electronic means for executing an emergency braking operation following detection of the occurrence of operational braking characteristics corresponding to the pressure in the master cylinder and to its rate of variation over time, said emergency braking operation being carried out with the assistance of a hydraulic block, distinguished in that the temporally close repetition of executing emergency braking operations is detected and in that the conditions for executing an emergency braking operation are adapted in the case of close repetition.

Thus, with such a system, it is advantageously possible to detect a situation of temporally close emergency braking operations that is liable to reduce the braking assistance delivered by the vacuum brake booster, the pressure difference between the two chambers of the brake booster not having time to become reestablished subsequent to these emergency braking operations. The method according to the invention, having determined the situation of sequenced braking operations, then adapts the conditions for executing emergency braking so as to make them less restrictive, the emergency braking situations being determined only from the pressure in the master cylinder and the gradient of this pressure in the master cylinder.

Preferably, in order to detect said temporally close repetition of emergency braking activations, a time base is activated after a first emergency braking operation so that said time base is active for a predetermined period, and in that an emergency braking counter is incremented, for as long as said time base is active, upon each new emergency braking operation, said counter being reinitialized if the time base is no longer active.

Thus, in an advantageous manner, the situation of sequenced emergency braking operations is characterized, according to the method, by counting the number of emergency braking operations carried out in a predetermined time interval. This determination can be implemented in a computer in a particularly simple manner and requires no other equipment.

In a preferred manner, the conditions for executing emergency braking are made less restrictive once said counter exceeds a predetermined value $N_s$, the time base then being reinitialized.

Thus, advantageously, a mapping is made of the braking assistance that can be provided by the vacuum brake booster as a function of the number of emergency braking operations carried out during a predetermined time interval. The method then adapts these emergency braking mode activation criteria to the number of emergency braking operations which it has counted, as a function of this mapping of the assistance provided by the brake booster.

Preferably, with the time base being active, said emergency braking counter is incremented only it the time interval Δt between two successive emergency braking operations is greater than a minimum value $T_1$.

This make it possible, in an advantageous manner, not to disturb a driver who is actuating the pedal heavily a number of times.

In a preferred manner, with the time base being active, said emergency braking counter is incremented only if the time interval Δt between the execution of two successive emergency braking operations is less than a maximum value $T_2$.

Thus, advantageously, the braking operations which have been carried out when the pressure difference between the two chambers of the brake booster has had time to become reestablished since the last emergency braking operation are not counted.

Preferably, with the time base being active, said counter is incremented only if the speed of the vehicle $V_v$ is greater than a minimum value $V_1$.

In a preferred manner, with the time base being active, the counter is incremented only if the speed of the vehicle $V_v$ is less than a maximum value $V_2$.

Preferably, said operational braking characteristics are:

$$\begin{cases} P_{MC} \geq P_{MC\_s} \\ \text{grad } P_{MC} \geq [\text{grad } P_{MC}]\_s \end{cases}$$

where:
$P_{MC}$ represents the pressure in the master cylinder,
$P_{MC\_s}$ is a predetermined threshold value of the pressure in the master cylinder,
grad $P_{MC}$ represents the gradient with respect to time of the pressure in the master cylinder, and
[grad $P_{MC}$]_s is a predetermined threshold value of the gradient of the pressure in the master cylinder.

Thus, an emergency braking situation is determined by taking into account only the criteria which are directly linked with the pressure in the master cylinder. Thus, to implement the method, only one pressure sensor is necessary, it being possible, for example, for this sensor to be placed at the outlet of the master cylinder.

The invention also relates to an assisted braking system making it possible to implement the method as described above in all its variants, distinguished in that it comprises:
  a hydraulic master cylinder associated with a vacuum brake booster and with at least one hydraulic circuit, designed to operate, separately or simultaneously, one or more wheel brakes each equipping a wheel of the vehicle, each wheel brake,
  a hydraulic block with electronic control comprising means for supplying high-pressure hydraulic fluid to said wheel brake or brakes,
  electronic means for executing an emergency braking operation following detection of the occurrence of operational braking characteristics corresponding to the pressure in the master cylinder and to its rate of variation over time, said emergency braking operation being carried out with the assistance of said hydraulic block, and
  means for detecting the temporally close repetition of executing emergency braking operations and for adapting the conditions for executing emergency braking operations in the case of close repetition.

The system preferably comprises a pressure sensor delivering a signal representative of the pressure in said master cylinder.

Thus, in an advantageous manner, the information concerning the pressure in the master cylinder and also the gradient with respect to time of this master cylinder are obtained directly.

BRIEF DESCRIPTION OF THE DRAWINGS

Other features and advantages of the present invention will become apparent on examining the description below presented purely by way of non-limiting illustrative example, with reference to the appended figures, in which.

DETAILED DESCRIPTION OF THE INVENTION

Figure 1:
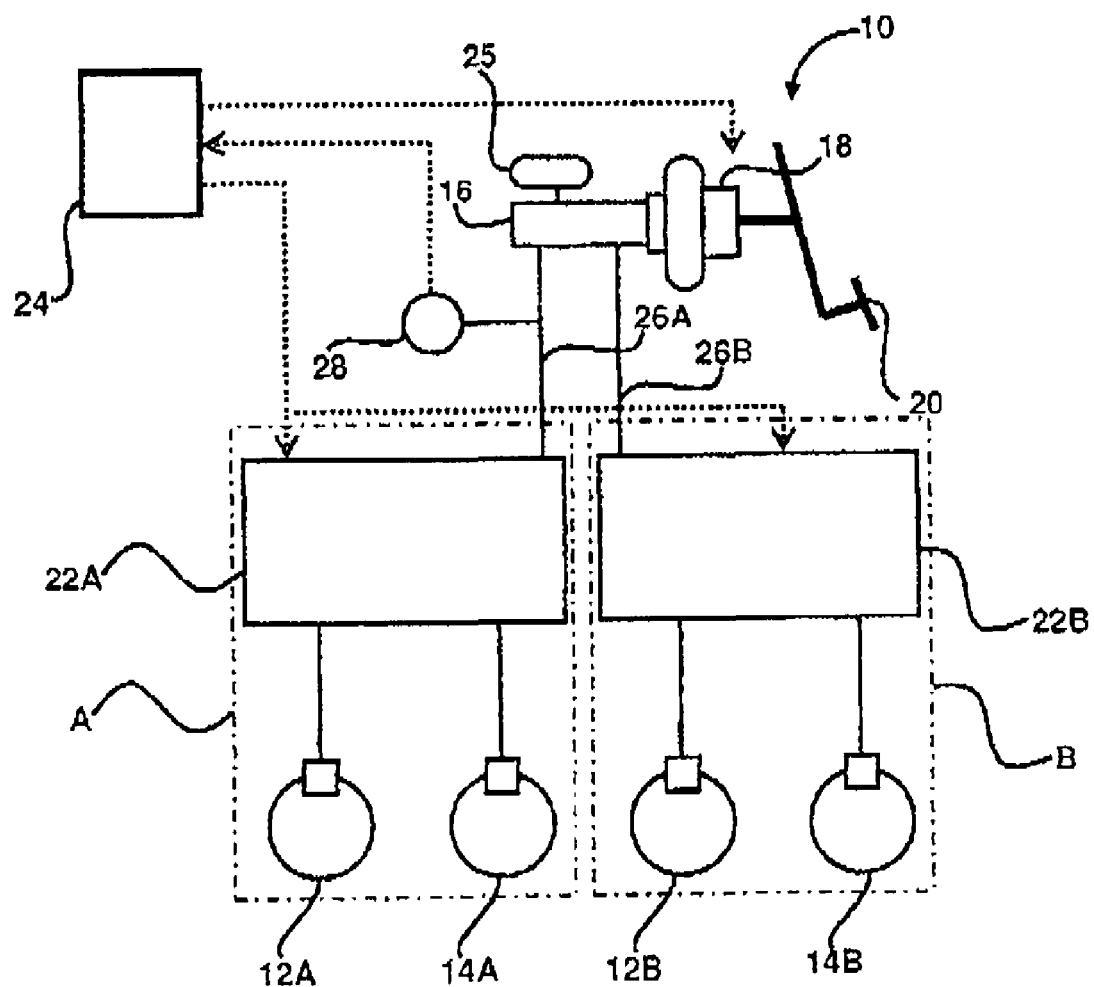
FIG. 1 schematically represents a braking system allowing the implementation of the method according to the invention.

FIG. 1 thus represents a motor vehicle braking system 10 allowing the implementation of the method according to the invention. Without implying any limitation for the implementation of the invention, the system 10 is a braking system with an ABS hydraulic block having a known ESP/ASR function, such a braking system being described, for example, in U.S. Pat. No. 6,361,126 mentioned above.

In the braking system 10, there is provided a left front-wheel brake 12A and a right front-wheel brake 14A which are combined in a front-axle braking circuit A, and a left rear-wheel brake 12B and a right rear-wheel brake 14B which are combined in a rear-axle braking circuit B.

These wheel brakes 12A, 14A, 12B, 14B are supplied, during normal assisted braking, by a master cylinder 16 assisted by a vacuum brake booster 18 controlled by a brake pedal 20. Furthermore, the two front-axle and rear-axle hydraulic circuits A and B are identical and allow for the interposition, between the master cylinder 16 and the wheel brakes 12A, 14A, 12B, 14B, of a hydraulic block 22A, 22B with electronic control 24 adapted to perform the ABS, ASR and/or ESP functions. Without departing from the scope of the invention, use is generally made of the negative pressure of the engine intake manifold or of a negative pressure generated by an air pump (in particular in the case of diesel engines).

A more detailed description will be given below of an example of a front-axle hydraulic circuit A which makes it possible to perform the ABS, ASR and/or ESP functions, the rear-axle hydraulic circuit B being substantially identical to the front-axle hydraulic circuit A. However, other axle hydraulic circuit configurations are conceivable without departing from the scope of the invention.

In the case of a normal braking operation, the front-axle hydraulic circuit A is supplied with pressurized hydraulic fluid by a master cylinder 16, actuated by means of a brake pedal 20 via a brake booster 18, the master cylinder 16 and the brake booster 18 being of known types and operations. The master cylinder 16 is, moreover, connected in a conventional manner to a hydraulic fluid reservoir 25. This same master cylinder 16 has two hydraulic outlets 26A, 26B respectively supplying the front-axle hydraulic circuit A and rear-axle hydraulic circuit B. A pressure sensor 28 is connected to the hydraulic outlet 26A and makes it possible to measure a pressure representative of the pressure $P_{MC}$ in the master cylinder, the pressure at the two hydraulic outlets 26A, 26B of the master cylinder 16 being assumed to be equal.

In the present application, the term "valve" is used instead of the term "solenoid valve" to make the application easier to read, it being understood that all the "valves" of the system 10 are solenoid valves controlled by output signals emitted by the electronic control unit 24.

A nonlimiting illustrative example of a front hydraulic block 22A suitable for implementing the method according to the invention will be described below.

In order to regulate the braking pressure, and hence to implement the ABS system, the front hydraulic block 22A comprises two inlet valves and two outlet valves, these inlet and outlet valves being able to be controlled electrically and each being associated with one of the wheel brakes 12A, 14A. The hydraulic block 22A also comprises a return line which makes it possible to reduce the braking pressure of the wheel brakes 12A, 14A by discharging hydraulic fluid from the wheel brakes 12A, 14A to a low-pressure accumulator, or even to the main braking line. A non-return valve is arranged on the return line between a delivery pump and the low-pressure accumulator. The delivery pump supplies high-pressure fluid to the brakes 12A, 14A, 12B, 14B during phases of reincreasing the braking pressure.

The ABS system is controlled by the electronic control unit 24, to which sensors (not shown) for detecting the rotational speed of the wheels are connected.

Finally, the front-axle hydraulic block 22A comprises, moreover, a pressure-limiting valve which, in the closed position, blocks the direct flow of the hydraulic fluid from the master cylinder 16 to the main braking line, and a preload valve which, in the "passing" position, connects the hydraulic outlet 26A of the master cylinder to the low-pressure inlet of the delivery pump. These two valves are also controlled by the electronic control unit 24, which closes these two valves during the emergency braking mode.

The assisted braking system 10 makes it possible to execute a normal assisted braking operation which, by means of the ABS, can be optimized. The operating principle of the braking system 10 in normal assisted braking mode is not specific to the system and is known per se. Consequently, this normal braking mode is not described in more detail below.

The braking mode termed emergency braking mode can be executed by the braking system 10 as represented in FIG. 1. This emergency braking mode is also executed by means of the electronic control unit 24, in response to activation criteria which will be explained below. With these criteria satisfied, the electronic control unit 24 then switches the pressure-limiting valves into their blocking position and the preload valves for the delivery pumps into their passing position. Furthermore, the delivery pumps are engaged. The delivery pumps then serve as a high-pressure hydraulic fluid source for the front-axle and rear-axle hydraulic circuits A and B. With the ABS being brought into play, the vehicle braking distance is also optimized.

To activate this emergency braking mode, use is made according to the invention of a method which has the advantage of adapting to repeated emergency braking situations.

According to this method, the emergency braking situation is determined from a high-pressure threshold in the master cylinder 16 and from a steep gradient, with respect to time, of the pressure in the master cylinder 16.

Thus, in practice, in order to determine an emergency braking situation, the starting point is to measure the pressure $P_{MC}$ at the outlet of the master cylinder 16 by means of a pressure sensor 28, and this sensor is connected to the electronic control unit 24 such that it can calculate the pressure gradient grad ($P_{MC}$) in the master cylinder 16.

Figure 2:
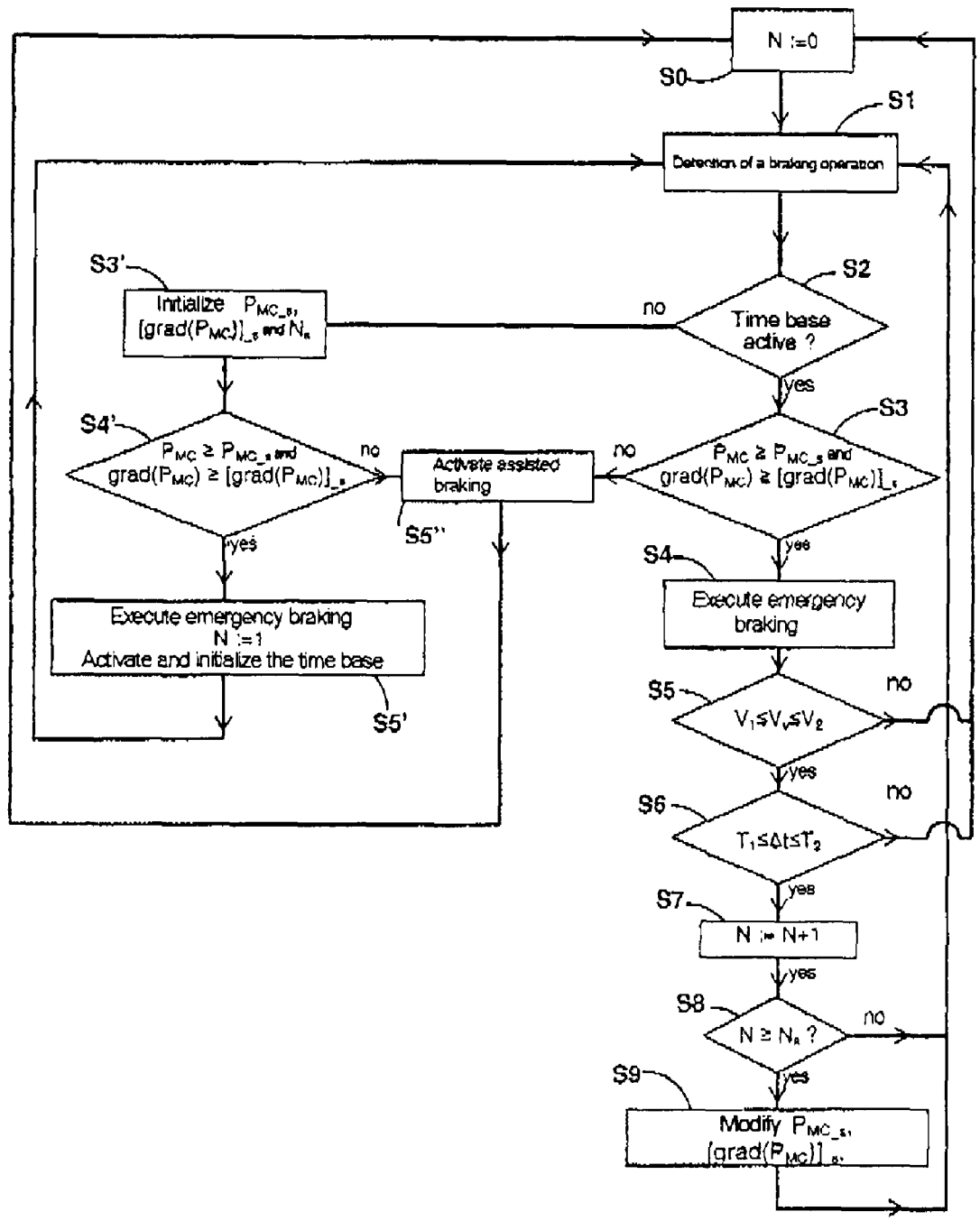
FIG. 2 represents a flowchart of the operation of the method according to the invention.

The braking control method, represented in the form of a flowchart in FIG. 2, is then implemented.

The initial step S0 of the method consists in initializing an emergency braking counter N to the value 0.

Next, once a braking operation has been detected, at S1, the electronic control unit 24 verifies, at the second step S2 of the method, whether a time base is active.

This time base serves as a timer, thus making it possible to measure time intervals. Thus, the initialization of the time base corresponds to setting the timer to zero, and the activation of the time base corresponds to the triggering of the timer. After a predetermined time $T_B$, the time base is deactivated, which corresponds to the timer being stopped.

If the time base is not active, that means that the braking detected has not been preceded by an emergency braking operation, at least not within a time period which is sufficiently long (greater than $T_B$) to allow the pressure difference to be properly reestablished between the two chambers of the brake booster. In this case, the method according to the invention, at the step S3', initializes the following values:

$P_{MC\_s}$ which represents a predetermined threshold value of the pressure of the master cylinder,

[grad ($P_{MC}$)]$_{\_s}$ which represents a threshold value of the gradient, with respect to time, of the pressure in the master cylinder, and $N_s$ which represents a threshold number of emergency braking operations which can be activated in a predetermined time interval.

Then, at step S4', it is verified whether the characteristic conditions of emergency braking are satisfied, that is to say whether:

$$\begin{cases} P_{MC} \geq P_{MC\_s} \\ \text{and} \\ \text{grad}(P_{MC}) \geq [\text{grad}(P_{MC})]\_s \end{cases} \quad (C1)$$

If the dual condition C1 is not fulfilled, conventional assisted braking is executed, at the step S5", and a restart is made at the start of the process, at the step S0.

By contrast, if the condition C1 is fulfilled, at the step S5' of the method according to the invention, emergency braking is executed, and the emergency braking counter N is incremented to the value 1 (n:=1). Moreover, the time base is activated so as to remain active during the predetermined time $T_B$, and initialized. A return is then made to the step S1 of the method, on standby for a subsequent braking operation.

If that braking operation occurs quite close to the first emergency braking operation such that the time base is still active, the step S3 of the method according to the invention will be carried out, this consisting in verifying whether the dual condition C1, which is characteristic of emergency braking, is fulfilled. If that is not the case, normal assisted braking is executed, at the step S5". If, by contrast, the dual condition C1 is fulfilled, emergency braking is executed, at the step S4.

The following step S5 of the method consists in comparing the speed of the vehicle $V_v$ to a minimum value $V_1$ and to a maximum value $V_2$ to verify whether the condition:

$$V_1 \leq V_v \leq V_2 \quad (C2)$$

is met. It is thus possible to exit the method if the condition C2 is not verified and to return to the start of the method, at S0. In this particular case, and with no limitation being implied, $V_1$ can be chosen to be around 80 km/h and $V_2$ can be chosen to be around 120 km/h.

If the condition C2 is met, the method, at the step S6, consists in comparing the elapsed time interval $\Delta t$ between the last two braking operations (there is certain to be a preceding braking operation stored in memory since the timing is active) with a minimum value $T_1$ and a maximum value $T_2$, such that $T_1 < T_2$, in order to verify whether the condition $$T_1 \leq \Delta t \leq T_2 \quad (C3)$$

is duly met.

If the time interval $\Delta t$ is too short, the emergency braking operation is not counted as a new emergency braking operation. If, by contrast, this time interval is too large, the pressure difference between the two chambers of the brake booster 20 has had time to become reestablished after the preceding emergency braking operation. In both cases, a restart is then made at the starting point of the method, at the step S0.

In this particular case, and with no limitation being implied, a time $T_1$ can be chosen to be around ten seconds and a time $T_2$ can be chosen to be around one minute, this time $T_2$ being less than $T_B$ in any event.

If the condition C3 is met, the counter N is incremented by one at the step S7. At the following step S8 of the method, the value N of the counter is compared with the threshold value $N_s$, which represents a threshold number of emergency braking operations which can be activated in a predetermined time interval.

If $N \leq N_s$, a restart is made at the step S1 of the method, on standby for the detection of a new braking operation.

If, by contrast, $N \geq N_s$, that means that a large number of emergency braking operations has been carried out in a time which is less than $T_B$, such that the pressure difference between the two chambers of the brake booster, which makes it possible to increase the pressure in the master cylinder, is reduced. It is then difficult to achieve the emergency braking activation thresholds. At the step S9 of the method, the stored values of the thresholds $P_{MC\_s}$ and $[\text{grad}(P_{MC})]\_s$ are then lowered so as to make the dual condition C1 less restrictive and, hence, to make it easier to activate emergency braking. This lowering of the threshold values will of course be adapted so as not to make emergency braking too sensitive and will be dependent on the vehicle on which the process according to the invention will be used.

A return is then made to the step S1 of the method, on standby for a subsequent braking operation.

If no braking appears within the time period $T_B$, the time base is deactivated, that is to say that it is stopped.

Moreover, if a braking operation is commanded with parameters $P_{MC}$ and $\text{grad}(P_{MC})$ which are less than the new conditions, an exit is made from the method, that is to say that a restart is made at the start of the method, at S0.

Of course, the present invention is not limited to the case presented, which is provided by way of nonlimiting illustrative example. Furthermore, the hydraulic block employed by the method according to the invention can vary significantly, the method being able to be applied with any hydraulic block for braking a motor vehicle that allows the execution of an emergency braking mode performed either in a preloaded manner by the master cylinder, as described in the present exemplary embodiment, or autonomously.

The invention claimed is:

1. A method of controlling braking in a motor vehicle provided with an assisted braking system, the method comprising:

providing a hydraulic master cylinder associated with a vacuum brake booster and with at least one hydraulic circuit, configured to operate, separately or simultaneously, one or more wheel brakes each equipping a wheel of the vehicle;

executing an emergency braking operation following detection of occurrence of operational braking characteristics corresponding to pressure in the master cylinder satisfying a first predetermined threshold and a rate of variation of the pressure in the master cylinder over time satisfying a second predetermined threshold, the emergency braking operation being carried out with assistance of a hydraulic block controlled by an electronic control unit, the hydraulic block including a pressurizing unit to supply high-pressure hydraulic fluid to the one or more wheel brakes;

detecting via the electronic control unit one or more temporally close repetitions of the executing of the emergency braking operation; and adapting conditions for repeatedly executing the emergency braking operation upon detecting the one or more temporally close repetitions, the adapting being performed by the electronic control unit and including adapting the first predetermined threshold and the second predetermined threshold.

2. The method as claimed in claim 1, wherein, to detect the one or more temporally close repetitions of the emergency braking operation a time base is activated after a first emergency braking operation so that the time base is active for a predetermined period, and an emergency braking counter is incremented, for as long as the time base is active, upon each new emergency braking operation, the counter being reinitialized if the time base is no longer active.

3. The method as claimed in claim 2, wherein the conditions for executing the emergency braking operation are made less restrictive once the counter exceeds a predetermined value, the time base then being reinitialized.

4. The method as claimed in claim 2, wherein, with the time base being active, the emergency braking counter is incremented only if a time interval between two successive emergency braking operations is greater than a minimum value.

5. The method as claimed in claim 2, wherein, with the time base being active, the emergency braking counter is incremented only if a time interval between execution of two successive emergency braking operations is less than a maximum value.

6. The method as claimed in claim 2, wherein, with the time base being active, the counter is incremented only if speed of the vehicle is greater than a minimum value.

7. The method as claimed in claim 2, wherein, with the time base being active, the counter is incremented only if speed of the vehicle is less than a maximum value.

8. The method as claimed in claim 2, wherein the operational braking characteristics are:

$$\begin{cases} P_{MC} \geq P_{MC\_s} \\ \mathrm{grad}\ P_{MC} \geq [\mathrm{grad}\ P_{MC}]\_s \end{cases}$$

in which:

$P_{MC}$ represents pressure in the master cylinder, $P_{MC}$ is a predetermined threshold value of the pressure in the master cylinder, grad $P_{MC}$ represents the gradient with respect to time of the pressure in the master cylinder, and

[grad $P_{MC}]\_s$ is a predetermined threshold value of the gradient of the pressure in the master cylinder.

9. An assisted braking system comprising:

a hydraulic master cylinder associated with a vacuum brake booster and with at least one hydraulic circuit, configured to operate, separately or simultaneously, one or more wheel brakes each equipping a wheel of the vehicle;

a hydraulic block with electronic control, the hydraulic block including a pressurization device that supplies high-pressure hydraulic fluid to the one or more wheel brakes;

an electronic control unit configured to execute an emergency braking operation following detection of occurrence of operational braking characteristics corresponding to pressure in the master cylinder satisfying a first predetermined threshold and a rate of variation of the pressure in the master cylinder over time satisfying a second predetermined threshold, the emergency braking operation being carried out with assistance of the hydraulic block, to detect one or more temporally close repetitions of the executing of the emergency braking operation, and to adapt conditions for repeatedly executing the emergency braking operation upon detecting the one or more temporally close repetitions, the conditions being adapted including the first predetermined threshold and the second predetermined threshold.

10. The system as claimed in claim 9, further comprising a pressure sensor delivering a signal representative of the pressure in the master cylinder to the electronic control unit.

* * * * *